June 1, 1948. K. J. VAN SICKLE 2,442,520
ROW CROP SILAGE HARVESTER
Filed July 9, 1945 4 Sheets-Sheet 1

INVENTOR.
Kenneth J. Van Sickle
BY Edward H. Rumpston
his Attorney

INVENTOR.
Kenneth J. Van Sickle
BY Edward H. Cumpston
his Attorney

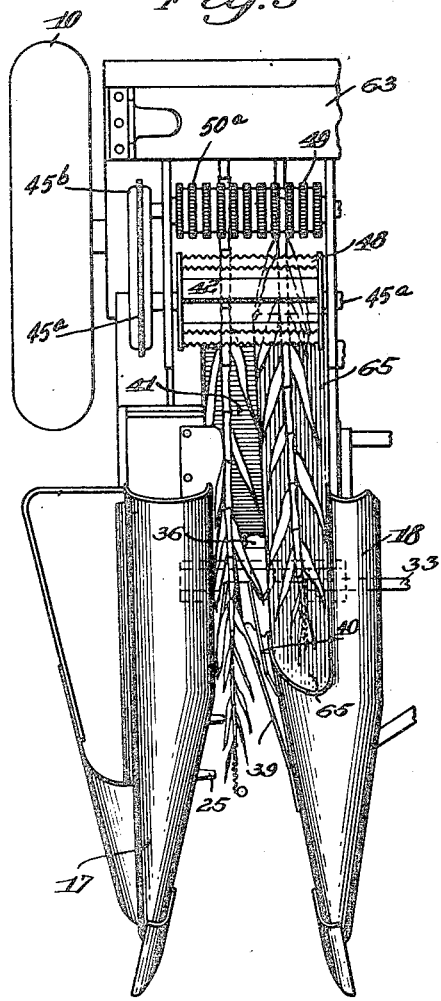
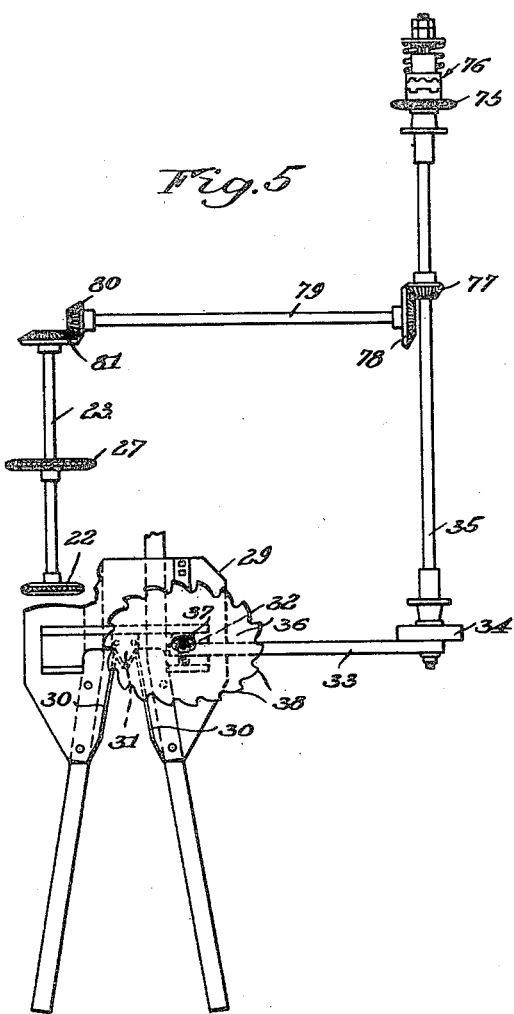
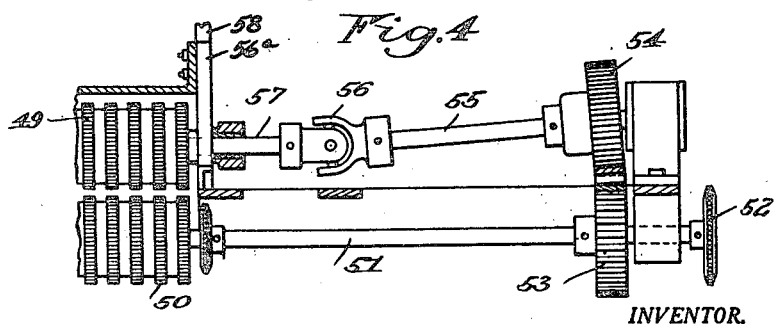

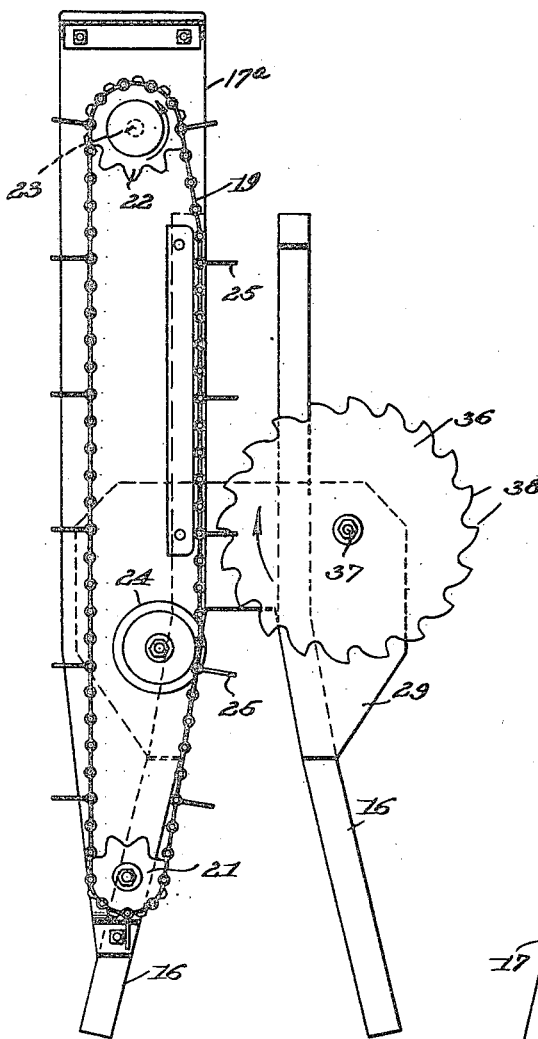
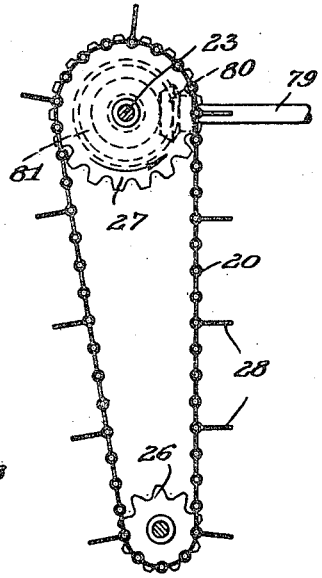
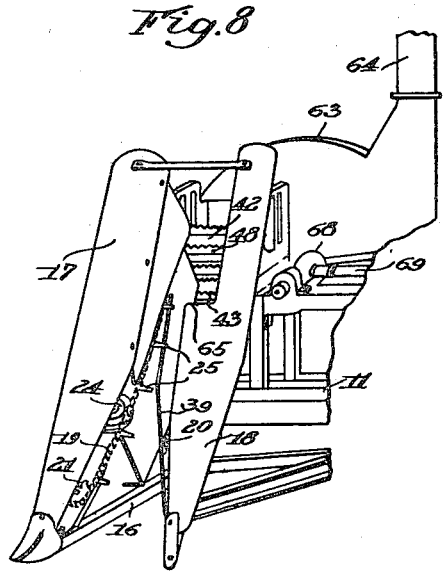

Patented June 1, 1948

2,442,520

UNITED STATES PATENT OFFICE 2,442,520

ROW CROP SILAGE HARVESTER

Kenneth J. Van Sickle, Shortsville, N. Y., assignor to Papec Machine Company, Shortsville, N. Y., a corporation of New York Application July 9, 1945, Serial No. 603,782

1 Claim. (Cl. 56—16)

This invention relates to row crop silage harvesters, and, more particularly, to the variety in which the standing stalks are severed between spaced gathering frames provided with gathering means for conveying the severed stalks to feeding means and to the cutter mechanism by which they are chopped up into short lengths for discharge by suitable means from the machine. It has been proposed, as in the patent to I. H. Erb, No. 1,457,828, to convey the severed stalks between spaced gathering frames provided with upper and lower gathering chains, the lower traveling more rapidly than the upper, the stalks being carried upwardly and simultaneously turned, substantially within a vertical plane, to present their butt ends to the feeding and cutting means and so as to pass in a substantially straight line through the machine to the cutter. Such a machine has not proven wholly satisfactory, however, for while such direct movement of the stalks to the cutter, in a substantially vertical plane, is in itself a simple and desirable way of handling the stalks, the most advantageous types of cutting mechanisms have a horizontal intake, with the result that such feeding of the stalks in vertical arrangement to the horizontally extending cutter shear plate, so concentrates and confines the feed to a limited portion of the cutter intake or stationary cutter bar as to tend to overload and jam it and so limit operation of the mechanism to a low rate of speed.

One object of the invention, therefore, is to provide an improved harvester of the character described having a more simple and practical type of construction with a higher rate of operation and capacity.

Another object is to provide such a machine in which the stalks are conveyed through the machine in a simple and direct manner and distributed lengthwise of the intake of the cutting means, so as to more uniformly distribute the load for operation at maximum efficiency.

More specifically stated, it is an object of the invention to provide an improved machine in which the severed stalks are conveyed and turned by simple and direct movements, substantially in a vertical plane, to present their butt ends to horizontally extending means for feeding them to the cutting mechanism, and in which simple and practical provisions are also made for distributing the stalks lengthwise of the horizontal intake of the feeding means for the cutter, to the end of increasing the capacity of the cutting mechanism as one of the principal factors heretofore limiting the capacity of such machines.

A further object is to provide an improved machine of the above character having more simple and effective means on the gathering frames for gathering the stalks for severance and conveyance to the cutting mechanism.

To these and other ends the invention resides in certain improvements and combinations of parts, all as will be hereinafter more fully described, the novel features being pointed out in the claim at the end of the specification.

In the drawings:

Fig. 3 is a view similar to Fig. 2 but showing only one side of the machine with cut stalks passing therethrough to illustrate the operation thereof;

Fig. 4 is an enlarged section on the line 4a—4a in Fig. 2, showing part of the driving mechanism;

Fig. 5 is a diagrammatic view of another portion of the driving mechanism as shown in Fig. 2 but detached for clearer illustration;

Fig. 6 is a top plan view of the upper gathering chain mechanism and associated parts on the same as in Fig. 1 but detached and partly in section;

Fig. 7 is a view similar to Fig. 6 but showing the lower gathering chain, and

Fig. 8 is a perspective view on a reduced scale of the crop gathering and feeding means and related parts as viewed from the front of the machine with other parts thereof broken away.

Figure 1:
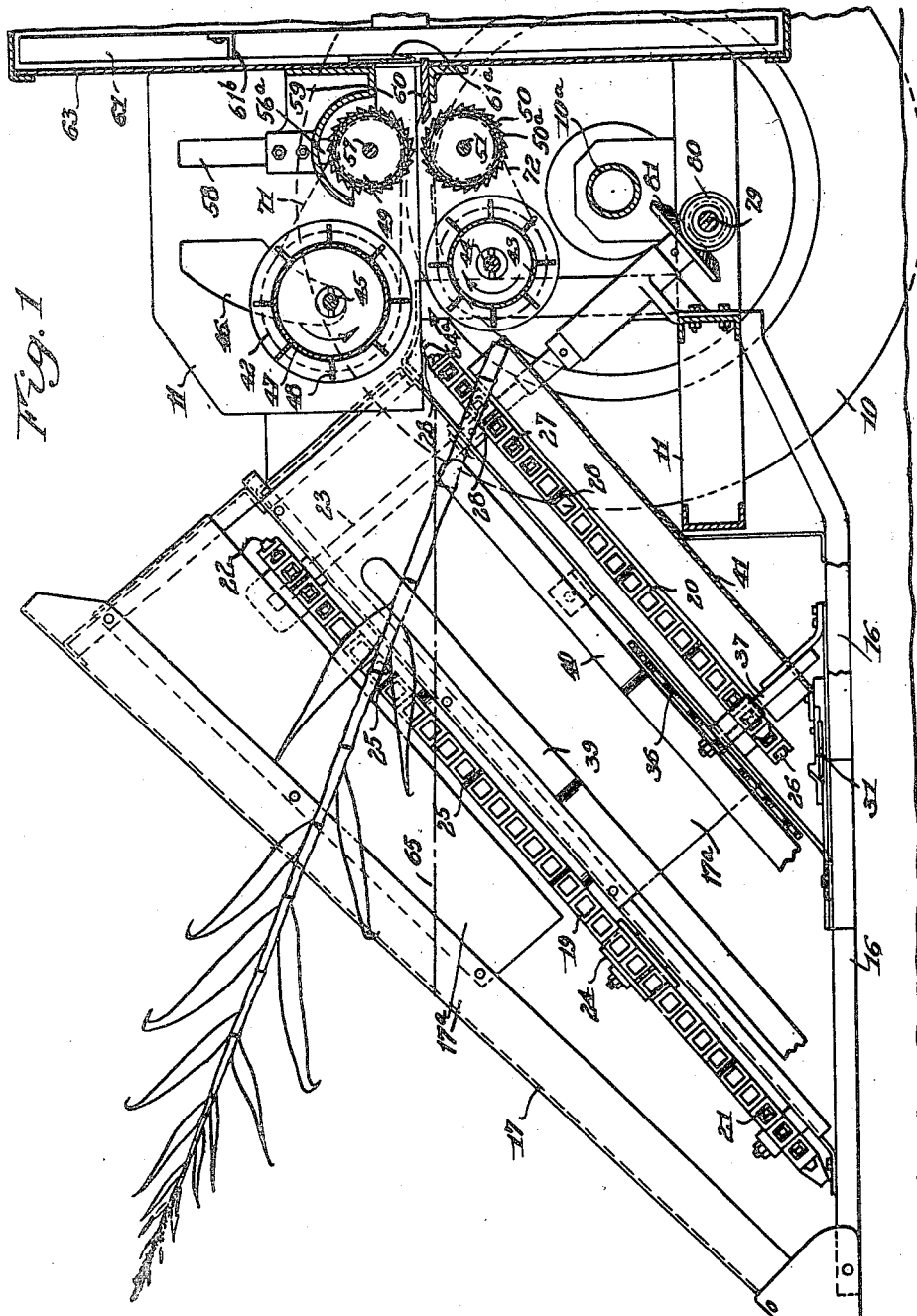
Fig. 1 is a vertical, longitudinal section, partly broken away, showing a silage harvester machine embodying the present invention.

The invention is embodied in the present instance, by way of illustration, in a single row crop silage harvesting machine, comprising a motor unit for driving the cutting, gathering and feeding means for feeding the crop to a combined ensilage cutter and blower, driven by the same motor unit and provided with means for delivering the cuttings to an accompanying truck or other receptacle.

Referring more specifically to the drawings, the machine comprises a pair of ground wheels 10 (Figs. 1 and 2) on an axle 10a on which is carried a main frame, indicated generally at 11, comprising a pair of forwardly extending and intersecting beams 12 and 13, carrying the usual draft bar 14. Mounted at one side of the frame is a motor unit 15, of known variety, for driving the various parts of the mechanism, as hereafter described. At the other side of the main frame is a forwardly extending, auxiliary frame 16, carrying the crop cutting and gathering mechanism, this auxiliary frame being pivotally mounted and provided with known means (not shown), for raising and lowering it relative to the main frame, for adjusting the vertical height of the crop severing knives, as well understood in the art.

Mounted on the auxiliary frame are a pair of spaced, upwardly and rearwardly inclined gathering frames, 17 and 18. The outer or right hand frame 17 carries upper and lower gathering chains, 19 and 20. The upper chain 19 is supported at its forward end by an idler sprocket 21 rotating on the upper end of a short downwardly and rearwardly inclined stud on frame 17 and at its rear end by a sprocket 22, fixed on a downwardly and rearwardly inclined shaft 23, by which it is supported and driven. At 24 is an idler roll for guiding the chain through a path substantially parallel with the inner face 17a of the gathering frame, which at its forward end, converges toward the opposite frame 18 as far as roll 24 and then extends rearwardly in substantially parallel, spaced relation with the opposite frame 18, as shown. The chain carries a series of spaced fingers 25, for gripping and moving the mass of crop rearwardly through the space between the gathering frames to means for feeding it to the cutter and blower. Adjacent the bottom of the gathering frame 17 is a lower gathering chain 20 carried at its forward end around an idler sprocket 26, Figs. 1 and 7, rotating on a downwardly and rearwardly inclined stud on the lower portion of the frame. The rear end of the chain is carried by a sprocket 27 fixed on shaft 23. Sprocket 27 is larger than the driving sprocket 22 of the upper gathering chain 19 and drives the lower chain 20 at a faster rate of travel, for a purpose hereafter described. Chain 20 is provided with a series of spaced fingers 28 for gripping and moving the crop mass rearwardly to the feeding means.

Adjacent the forward end of the lower chain 20, the gathering frames converge to a throat plate 29, on which is mounted a knife mechanism for severing the standing stalks, comprising, preferably, a pair of spaced converging side knives 30 and a cooperating, transversely reciprocating, double-edge knife 31, of the known or any suitable type, as well understood in the art, the construction of which forms no part of the present invention and requires no detailed description. The knife 31 is mounted on a sliding plate 32 reciprocated by a pitman 33 actuated at its other end by a wrist plate 34 on a shaft 35 of the driving mechanism hereafter described.

To assist in gathering and pressing the stalks into engagement with the gathering chains, an idler wheel 36 is rotatably mounted on a trunnion 37 fixed on the bottom beam of the gathering frame 18. The wheel is formed circumferentially with a series of spaced recesses 38 and as the wheel is rotated by the engagement of the crop stalks in its recesses, the wheel tends to space and press the stalks against the lower gathering chain and into the path of its fingers 28.

For cooperation with the gathering chains of side frame 17, the opposite side frame 18 carries elongated upper and lower spring metal arms, 39 and 40, one preferably located inside each of the gathering chains, as shown (Fig. 1). These arms are fixed at their forward ends to the frame 18 and inclined rearwardly into proximity or contact with the opposite frame 17 to firmly press and hold the stalks into engagement with the gathering chains 19 and 20 and their gripping fingers. As the stalks are severed by the reciprocating knife means, they are pressed toward the gathering chains by the idler wheel 36 and by the spring arms 39 and 40, the stalks being carried rearwardly with their butt ends riding up a rearwardly and upwardly inclined bottom plate 41 connecting the gathering frames. Since the lower chain 20 travels faster than the upper chain, the stalks are gradually swung from their vertical standing position as cut, to an inclined or horizontal position, the butt ends rearward as shown, Figs. 1 and 3, to press the butt ends of the stalks into engagement with means for feeding the same to the cutter and blower mechanism, the stalks being thus moved from their standing position to the cutting mechanism in a substantially vertical plane or path, being thus gathered and moved in a simple and short path from standing position directly to the cutting mechanism at the rear of the machine.

Figure 2:
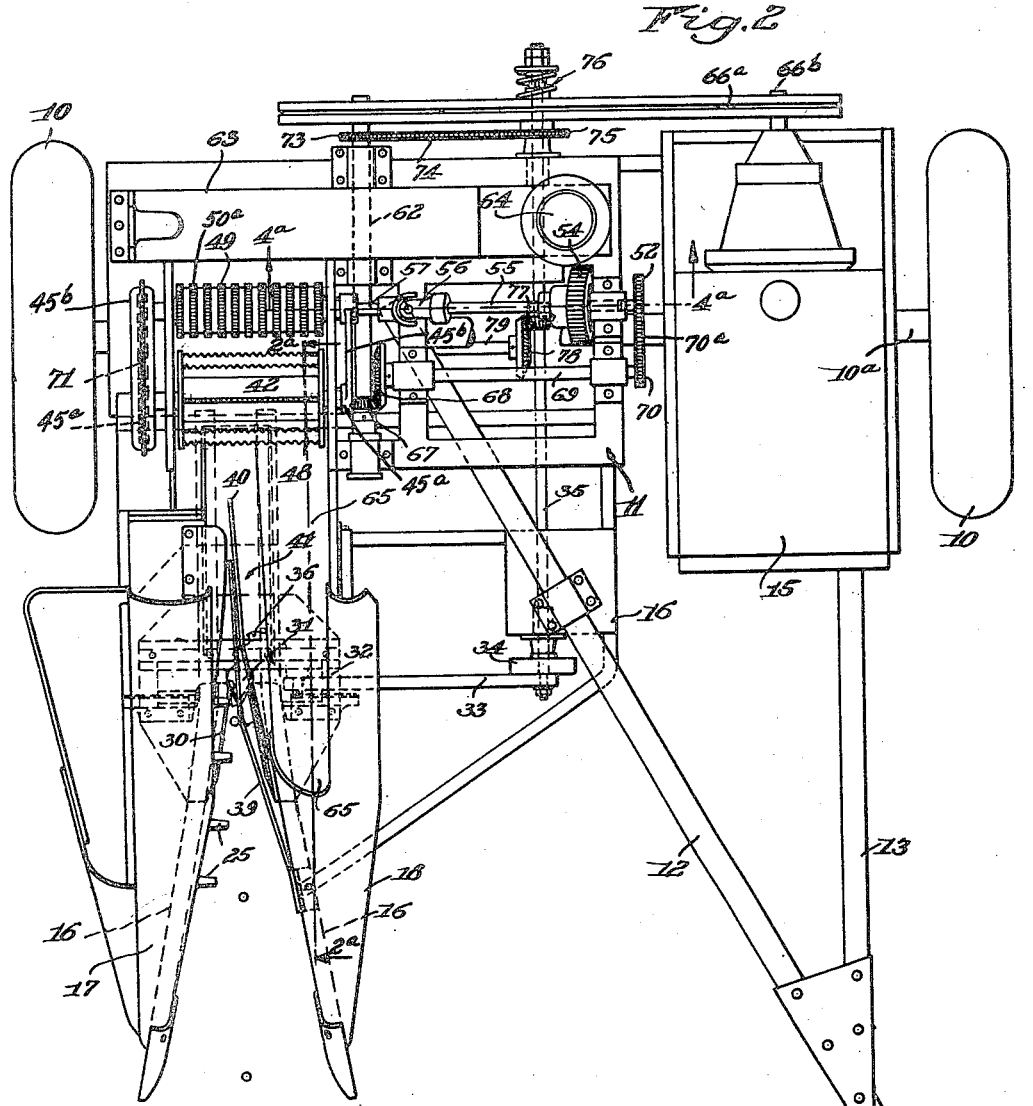
Fig. 2 is a top plan view of the same on a reduced scale.

The means for feeding the stalks to the cutter and blower mechanism comprises, preferably, a first or preliminary pair of horizontal feed rolls, 42 and 43 (Figs. 1, 2 and 3). The lower feed roll 43 is fixed on a shaft 44 supported at its ends in suitable bearings on the frame, while the upper roll 42 is fixed on a shaft 45 rotating at its ends in bearings 45a movably supported by arms 45b pivoted on shaft 57. The bearings move in openings, as 46, in the frame walls at the ends of the rolls, the shaft 45 being preferably pressed downwardly by the weight of the parts associated therewith, for pressing the upper roll 42 toward the lower roll and permitting it to yield, during passage between the rolls of exceptional masses of stalks, or unyielding foreign objects, and generally for maintaining gripping pressure of the rolls against the stalks. These rolls are preferably formed with a cylindrical body 47, on which are fixed toothed vanes 48, as shown, for effectively gripping the stalks. The rear upper end of the bottom plate 41 preferably terminates, as shown, adjacent or slightly below the horizontal throat between the rolls 42 and 43, so that the butt ends of the stalks, as moved by the gathering chains, are carried directly into the horizontal throat between the rolls. Rearwardly of the preliminary rolls 42 and 43 is a pair of smaller, horizontal main feed rolls, 49 and 50, formed with circumferentially spaced, longitudinally extending serrations as 50a, adapted to firmly grip and hold the stalks. The lower roll 50 is mounted on a shaft 51 rotatably supported at its ends in suitable bearings in the frame walls, the shaft being extended at one end (Fig. 4) and having fixed thereon a driving sprocket wheel 52. Fixed on the shaft also is a gear 53 meshing with a gear 54 fixed on a short shaft 55, the gears 53 and 54 being designed to mesh with the shafts 51 and 55 slightly inclined to each other as shown. Shaft 55 includes a universal joint connection 56 with one end of the shaft 57 of the upper roll 49, to accommodate some vertical movement of the bearings, as 56a, of shaft 57 which are in the form of blocks slidably mounted and guided in vertical slots 58 in the opposite walls of the frame carrying the rolls, for the purpose of permitting the upper roll to yield on passage between them of an exceptional bulk of stalks, or hard foreign objects. The weight of shaft 57 and the parts associated therewith serves to press the upper roll toward the lower and so maintain close engagement with the stalks.

From the feed rolls 49 and 50 the crop is fed through the intake opening 59 and over the horizontally extending shear plate 60 to an ensilage cutter and blower of the type disclosed in the patent to W. H. Preston, No. 2,115,234, comprising a cutter wheel 61 provided with knives 61a, for cooperation with the shear plate 60 and with fan blades 61b, of known construction, such, for example, as disclosed in said patent. Cutter wheel 61 is fixed on a horizontal shaft 62, rotated by means hereafter described, in a housing 63 provided with a discharge outlet 64, through which the cut ensilage is blown to a suitable point of discharge.

In a machine of the advantageous type referred to above, in which the crop is gathered and turned substantially within a vertical plane or path, to present the butt ends of the stalks rearwardly and directly to feeding and cutting mechanism of the type including a horizontal shear plate extending transversely of said path, the mass of crop is concentrated at that portion of the shear plate lying in the plane of feed between the spaced gathering frames, with the result of overloading that particular portion of the cutting mechanism, so that it becomes the bottle-neck or limiting factor in the rate of operation and capacity of the machine. It has been found that this difficulty may be overcome and the overall capacity of the machine materially increased by a simple and practical construction by which the crop stalks are spread transversely of the path of feed between the spaced gathering frames and distributed horizontally and lengthwise of the intake of the means for feeding the same to the cutter shear plate.

Figure 2A:
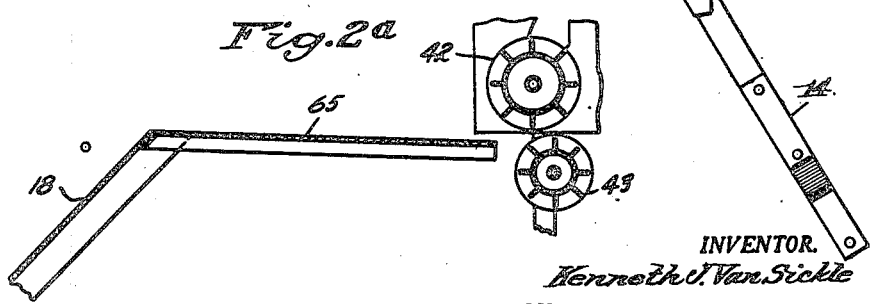
Fig. 2a is a sectional elevation on the line 2a—2a in Fig. 2, partly broken away and showing portions of the conveying and feeding mechanism.

This construction for distributing the crop mass lengthwise of the intake 64a of the feeding means comprises a horizontal bed 65, formed on the upper portion of the gathering frame 18 substantially opposite the point at which the crop stalks, after being turned horizontally, are engaged by the preliminary feed rolls and released by the gathering chains and the spring arms 39 and 40, or, in other words, just above the position of the stalk shown in Fig. 1. Bed 65 is formed by an elongated horizontal plate welded or otherwise fixed to the gathering frame 18 in a recess formed in the inner upper surface thereof and extending adjacent the intake of the feed rolls 42 and 43, as shown in Figs. 2 and 2a, on which plate or bed 65 a portion of the stalks are distributed and supported in a horizontal position, as they are drawn rearwardly by the feed rolls, as illustrated schematically in Fig. 3.

As the crop mass is gathered between the frames 17 and 18 and further compacted by the spring arms 39 and 40 against frame 17 and its gathering chains, the mass becomes considerably compressed, so that on release by the spring arms, it expands and spreads across the space between the frames and onto the bed 65, so as to be distributed through a substantial space horizontally. As the feed rolls draw the stalks rearwardly, the stalks distribute themselves progressively lengthwise of the rolls, as indicated in Fig. 3, thus relieving the concentration of the load in the vertical path of feed of the stalks and distributing it lengthwise of the intake or bite between the feed rolls. With such distribution, the maximum load at any one portion of the feed rolls and cutter mechanism is relieved so as to increase the efficient speed of operation and capacity of these limiting portions of the machine.

The driving mechanism preferably comprises a driving belt 66 from a pulley 66a on the shaft 66b of the motor unit 15 to a pulley on the shaft 62 of the ensilage cutter mechanism. Shaft 62 carries a bevel gear 67, meshing with a bevel gear 68 on a transverse shaft 69, on the other end of which is fixed a sprocket wheel 70 connected by chain 70a with the sprocket wheel 52 on the shaft 51 of the lower feed roll 50. By means of the driving connection described above and shown in Fig. 4, the upper feed roll 49 is driven by and synchronously with the lower roll 50. Shaft 57 of the upper feed roll 49 has a sprocket chain connection 71 (Figs. 1 and 2) with the shaft of the upper preliminary feed roll 42, while shaft 51 of the lower feed roll 50 has a sprocket chain connection 72 with the shaft 44 of the lower preliminary feed roll 43.

A sprocket 73 fixed on shaft 62 is connected by a sprocket chain 74 with the sprocket 75 rotatable on the longitudinally extending shaft 35 (Figs. 2 and 5), clutch parts being provided, as indicated generally at 76, for clutching the sprocket to drive the shaft. Fixed on shaft 35 is a bevel gear wheel 77 meshing with a bevel gear wheel 78 fixed on a transverse shaft 79 on the frame and carrying at its other end a bevel gear 80 meshing with a bevel gear 81 fixed on the upwardly extending shaft 23, Fig. 1, which carries the sprockets 22 and 27 for driving the upper and lower gathering chains. The forward end of shaft 35 carries the wrist plate 34 and, through the connections described above, Fig. 5, drives the reciprocating knife 31 for severing the standing stalks. The machine is thus provided with a simple, direct, and effective driving mechanism.

The operation of the machine is apparent from the description of its construction. The stalks are collected between the gathering frames, severed by the reciprocating knife 31 and compressed by the wheel 36 and the spring arms 39 and 40 against the frame 17 and its gathering chains. The chains carry the stalks upwardly and rearwardly in a substantially vertical, straight path through the machine, simultaneously turning the stalks horizontally and presenting their butts to the preliminary feeding rolls 42 and 43. As the compacted crop mass is released by the spring arms, it expands and spreads transversely across the space between the gathering frames and onto the expansion bed 65, the stalks spreading progressively lengthwise of the horizontal intake of the feeding rolls as they are drawn into the latter from their distributed arrangement extending across the bed 65. The load on the feeding rolls and cutting mechanism is thus spread throughout the major portion of their extent, so as to fully utilize the same and greatly increase the dependent capacity of the machine.

It will thus be seen that the invention accomplishes its objects and while it has been herein disclosed by reference to the details of a particular embodiment, it is to be understood that such disclosure is intended in an illustrative, rather than a limiting sense, as it is contemplated that various modifications in the construction and arrangement of the parts will readily occur to those skilled in the art within the spirit of the invention and the scope of the appended claim.

I claim:

A row crop silage harvester comprising a pair of spaced gathering frames, means for severing standing stalks gathered between said frames, rotary cutter means for cutting the stalks into short lengths, coacting rotary members for feeding stalks to said cutter means, upper and lower gathering chains on one of said frames and means for driving the lower of said chains more rapidly than the upper thereof, resilient arm means on the other of said frames for pressing the stalks toward said chains and coacting therewith to convey stalks upwardly from said severing means and turn the same in a substantially vertical path and present the butt ends thereof to said feeding members, said feeding members being horizontally elongated and rotatable about substantially horizontal axes, and a substantially horizontal bed on the other of said frames extending adjacent said feeding members and on which the stalks are released by said chains and arm means and spread horizontally to distribute the same lengthwise of the bite between said feeding members.

KENNETH J. VAN SICKLE.

REFERENCES CITED

The following references are of record in the file of this patent:

UNITED STATES PATENTS

| Number | Name | Date |
|---|---|---|
| 1,457,828 | Herb | June 5, 1923 |
| 1,504,768 | Laminack | Aug. 12, 1924 |
| 1,909,909 | Struebing | May 16, 1933 |
| 2,253,794 | Lindhalm | Aug. 26, 1941 |